(12) United States Patent
Fujiwara et al.

(10) Patent No.: US 7,877,794 B2
(45) Date of Patent: Jan. 25, 2011

(54) RELAY APPARATUS, RELAY METHOD AND PROGRAM THEREFOR

(75) Inventors: Junya Fujiwara, Tokyo (JP); Takafumi Kinoshita, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 11/718,987

(22) PCT Filed: Nov. 24, 2005

(86) PCT No.: PCT/JP2005/021538

§ 371 (c)(1),
(2), (4) Date: May 10, 2007

(87) PCT Pub. No.: WO2006/057280

PCT Pub. Date: Jun. 1, 2006

(65) Prior Publication Data

US 2008/0104687 A1 May 1, 2008

(30) Foreign Application Priority Data

Nov. 29, 2004 (JP) ............................. 2004-344585

(51) Int. Cl.
G06F 7/04 (2006.01)
G06F 17/30 (2006.01)
G06F 21/22 (2006.01)

(52) U.S. Cl. ...................... 726/10; 713/169; 713/170; 713/153

(58) Field of Classification Search ........................ None
See application file for complete search history.

(56) References Cited

U.S. PATENT DOCUMENTS

| 6,708,200 | B1 | 3/2004 | Ura et al. |
| 2002/0035685 | A1* | 3/2002 | Ono et al. .................... 713/155 |
| 2002/0049912 | A1* | 4/2002 | Honjo et al. ................ 713/201 |
| 2002/0151300 | A1 | 10/2002 | Suda et al. |
| 2003/0101253 | A1 | 5/2003 | Saito et al. |
| 2004/0030643 | A1 | 2/2004 | Madison et al. |
| 2005/0210253 | A1* | 9/2005 | Shigeeda .................... 713/171 |

FOREIGN PATENT DOCUMENTS

| CN | 1283827 A | 2/2001 |
| JP | 2000-057112 | 2/2000 |

(Continued)

*Primary Examiner*—Nasser Moazzami
*Assistant Examiner*—Fikremariam Yalew
(74) *Attorney, Agent, or Firm*—Schmeiser, Olsen & Watts; William H. Steinberg

(57) ABSTRACT

A method and system for relaying communications between a communication terminal and a server. The relay apparatus receives from the communication terminal an access request for a service to be performed by the server. The access request identifies the server and the service, designates use of an inter-server encrypted communication system, specifies performing authentication of the relay apparatus, and specifies an authentication server to issue ticket information including an identification (ID) character string that identifies the relay apparatus. The relay apparatus receives the ticket information from the authentication server. The relay apparatus, encrypts the access request and transmits the encrypted access request and the ticket information to the server. The server uses the ticket information to authenticate the relay apparatus. The relay apparatus decrypts the access reply and transmits the decrypted access reply to the communication apparatus.

20 Claims, 8 Drawing Sheets

FOREIGN PATENT DOCUMENTS

| | | |
|---|---|---|
| JP | 2001-134534 | 5/2001 |
| JP | 2001-244996 | 9/2001 |
| JP | 2001-251297 | 9/2001 |
| JP | 2002-082907 | 3/2002 |
| JP | 2002-111747 | 4/2002 |
| JP | 2003-503963 | 1/2003 |

* cited by examiner

RELAY APPARATUS, RELAY METHOD AND PROGRAM THEREFOR

TECHNICAL FIELD

The present invention relates to a relay apparatus, a relay method and a program therefor. In particular, the present invention relates to a relay apparatus that receives client authentication by employing ticket information, which is issued in response to an access request transmitted by a communication terminal, and efficiently provides encrypted communication between servers, and a relay method and a program therefor.

BACKGROUND ART

Conventionally, a relay apparatus, such as a gateway, is employed to connect a local area network (LAN), such as a wired LAN, a wireless LAN or a mobile phone network, to a wide area network (WAN), such as the Internet. This relay apparatus relays communication between a communication terminal, such as a personal computer (PC), a portable information terminal (PDA) or a mobile phone, connected to the LAN and a server, such as a Web server, connected to the WAN.

As methods for exchanging very confidential data between a communication terminal and a server, a method for performing end-to-end encrypted communication between a communication terminal and a server, and a method for performing inter-server encrypted communication between a relay apparatus and a server have been proposed.

To perform end-to-end encrypted communication, a communication terminal encrypts a message and transmits the encrypted message, and a server decrypts the message. Further, the server encrypts a message and transmits the encrypted message, and the communication terminal decrypts the message. For this communication system, a relay apparatus is disclosed that transmits, to a communication terminal, a server public key that the communication terminal employs for encrypting a message, and that transmits, to the server, a communication terminal public key that the server employs for encrypting a message, so that the relay apparatus acts as a proxy for performing a mutual authentication process for the communication terminal and the server (patent document 1). Further, a technique is disclosed whereby a relay apparatus temporarily decrypts an encrypted message to add a change to the message (patent document 2).

On the other hand, for inter-server encrypted communication, normal non-encrypted communication is performed between a communication terminal and a relay apparatus, and encrypted communication is performed between the relay apparatus and a server. Especially for communication between a mobile phone, etc., and a server, the inter-server encryption communication is effective, because a network on the mobile phone side is a closed network that well maintains secrecy, and because, since a relay apparatus performs an encryption process instead of the mobile phone, the communication function is improved. As for this communication system, a technique is disclosed whereby a relay apparatus provides administrative control for the issue of a certificate used for authentication of a communication terminal, and by using this certificate, mutual authentication is performed between servers (patent document 3). Furthermore, a technique is disclosed whereby a certificate for a communication terminal is registered with a certificate administration server, and a communication terminal performs log-in authentication for the certificate administration server, via a relay apparatus, for downloading the certificate to the relay apparatus (patent document 4). In addition, a technique is disclosed whereby the ID of a relay apparatus along a communication path is employed to determine the authenticity of data exchanged by the relay apparatus and a server (patent document 5).

Moreover, a technique is disclosed whereby end-to-end encrypted communication and inter-server encrypted communication are switched, based on whether a server requests a certificate for a communication terminal (patent document 6).

Patent Document 1: Japanese Patent Application Laid-Open No. 2001-134534
Patent Document 2: Published Japanese Translation of PCT Patent Application, No. 2003-503963
Patent Document 3: Japanese Patent Application Laid-Open No. 2002-82907
Patent Document 4: Japanese Patent Application Laid-Open No. 2001-251297
Patent Document 5: Japanese Patent Application Laid-Open No. 2001-244996
Patent Document 6: Japanese Patent Application Laid-Open No. 2002-111747

DISCLOSURE OF THE INVENTION

Problems to be Solved by the Invention

In a case wherein a LAN, such as a mobile phone network to which a variety of communication terminals are connected, is to be connected to a WAN, it is preferable that a relay apparatus provide a conversion function for converting a Web page for mobile phone use, etc. Further, since the mobile phone network maintains secrecy well and the encryption processing capability of a mobile phone is comparatively low, it is preferable that the relay apparatus support inter-server encryption communication.

However, a huge number of mobile phones are connected to a mobile phone network, and when the administration of client certificates for individual mobile phones is centralized, as in patent document 3 or 4, the maintenance and administration costs are increased.

Therefore, one objective of the present invention is to provide a relay apparatus, a relay method and a program therefor that can resolve the above described problem. This objective can be achieved by a combination of features described in the independent claims of the invention. Further, the dependent claims define additional useful specific examples for the present invention.

Means for Solving the Problems

According to a first mode of the present invention, there is provided a relay apparatus, for relaying communications between a communication terminal and a server, comprises an access request receiver for receiving a first access request to said server from the communication terminal, a ticket information acquisition unit for, in response to the first access request, obtaining ticket information to identify the relay apparatus associated with the first access request from an external authentication server, the ticket information being used for authentication, an access request transmitter for encrypting the first access request and the ticket information and for transmitting the encrypted first access request and the encrypted ticket information to the server, an access reply decryption unit for decrypting an encrypted first access reply to said first access request, received from the server that has authenticated the reply apparatus using the ticket information, and an access reply transmitter for transmitting the decrypted first access reply to the communication terminal, and for which are provided a relay method and a program that are related to the reply apparatus.

It should be noted that the above described summary of the present invention neither enumerates all characteristics required for the present invention nor specifies that sub-combinations of these characteristics can also constitute the invention.

ADVANTAGES OF THE INVENTION

According to the present invention, a relay apparatus can be provided that obtains client authentication by employing ticket information that is issued in response to an access request transmitted by a communication terminal.

BEST MODE FOR CARRYING OUT THE INVENTION

The present invention will now be described, in due course, as one mode of the present invention. However, the present invention cited in claims is not limited to the following mode, and not all combinations of the characteristics described in the mode are requisite solving means for the present invention.

The configuration of a communication system 10 according to this mode is shown in FIG. 1. In a communication system 10 according to this mode, a relay apparatus 100 relays communications performed via a first network 110 and a second network 150. Based on requests received from a communication terminal 130, the relay apparatus 100 appropriately switches between end-to-end encrypted communication and inter-server encrypted communication. Further, for inter-server encrypted communication, the relay apparatus 100 receives client authentication that employs ticket information, such as a temporary, one-time password that is issued by an authentication server 170. In an environment wherein a variety of types of multiple communication terminals 130 are connected to the first network 110, the relay apparatus 100 can employ these functions to appropriately provide a WAN connection environment for the communication terminals 130.

The communication system 10 includes the first network 110, one or a plurality of base stations 120, one or a plurality of communication terminals 130, the second network 150, one or a plurality of Web servers 160, one or a plurality of authentication servers 170 and the relay apparatus 100.

The first network 110 is a local area network, to which the communication terminals 130 and the relay apparatus 100 are connected. In this mode, the first network 110 constitutes an example closed network, such as a mobile phone network provided by a mobile phone company. The base stations 120 are connected to the first network 110, and via wireless communication with the communication terminals 130, connect the communication terminals 130 to the first network 110. The communication terminals 130 are, for example, mobile phones, portable information terminals (PDAs), personal computers, etc., and incorporate functions for accessing the Web servers 160, via the second network 150, consonant with user instructions.

The second network 150 is a wide area network, to which the Web servers 160, the authentication servers 170, a certification authority 180 and the relay apparatus 100 are connected. In this mode, the second network 150 constitutes an example open network, such as the Internet. The Web servers 160 are example servers, related to the present invention, that provide documents, such as Web pages, or other content for a communication terminal 130, an access source. Further, the Web servers 160 perform service processes in response to requests received from the communication terminals 130, and relay the service process results to the communication terminals 130.

Consonant with a condition that mutual authentication be performed by a relay apparatus 100 and a Web server 160, the authentication server 170 generates ticket information, such as a one-time password, that the Web server 160 employs for the authentication of the relay apparatus 100, and issues the ticket information to the relay apparatus 100. And the certification authority 180 issues a relay apparatus 100 certificate (a client certificate) that is used for the authentication of the relay apparatus 100, and supplies the certificate to the relay apparatus 100.

The relay apparatus 100 is, for example, a gateway, and is connected to the first network 110 and the second network 150 to relay communications between a communication terminal 130 and a Web server 160. More specifically, the relay apparatus 100 receives from a communication terminal 130 an access request relative to a Web server 160, and transmits the access request to the Web server 160. Furthermore, the relay apparatus 100 receives from the Web server 160 an access reply to the access request, and transfers the access reply to the communication terminal 130. In this mode, an access request includes destination information for designating a Web server 160 at the destination, and service identification information for identifying a service process that should be performed by the Web server 160.

The relay apparatus 100 according to this mode can employ the following three types of communication systems: non-encrypted communication, end-to-end encrypted communication and inter-server encrypted communication.

(1) Non-Encrypted Communication

This is a communication system wherein the communication terminal 130 and the Web server 160 exchange messages using plaintext, without employing encryption. In consonance with an access request, received from a communication terminal 130, that includes communication system designation information specifying the performance of non-encrypted communication with a Web server 160, the relay apparatus 100 relays non-encrypted communications. An access request for non-encrypted communication may be an access request message, such as "GET http:// . . . ", requesting, for example, that documents or contents be downloaded, as plaintext, from a Web server 160, in accordance with HTTP protocol.

(2) End-to-End Encrypted Communication

This is a communication system wherein a communication terminal 130 and a Web server 160 encrypt a message and exchange the encrypted message, and the relay apparatus 100 performs a tunneling process, i.e., relays the message without applying conversion. That is, the relay apparatus 100 receives, from the communication terminal 130, an access request addressed to the Web server 160, and transfers the access request to the Web server 160. Further, the relay apparatus 100 receives, from the Web server 160, an encrypted access reply to the access request, and transfers the access reply in the encrypted state, unchanged, to the communication terminal 130.

In consonance with an access request, received from the communication terminal 130, that includes communication system instruction information instructing the communication terminal 130 and the Web server 160 to employ end-to-end encrypted communication to communicate, the relay apparatus 100 relays the end-to-end encrypted communication. An access request for end-to-end encrypted communication may include, for example, a connection request message, including "CONNECT https:// . . . ", that requests an SSL connection between the communication terminal 130 and the Web server 160, in accordance with HTTPS protocol. Further, the access request may, for example, be a message instructing a script call, using a CGI, that includes information designating a service program the Web server 160 should perform in response to the access request, or information designating a parameter to be provided for the service program.

(3) Inter-Service Encrypted Communication

This is a communication system wherein the relay apparatus 100 and a Web server 160 encrypt a message and exchange the encrypted message. That is, the relay apparatus 100 receives from a communication terminal 130 an access request addressed to the Web server 160, encrypts the access request, and transmits the encrypted access request to the Web server 160. Further, the relay apparatus 100 receives from the Web server 160 an encrypted access reply to the access request, decrypts the access reply, and transmits the decrypted access reply to the communication terminal 130. Here, plaintext may be employed for communication between the relay apparatus 100 and the communication terminal 130, or encrypted communication may be performed using encryption/decryption keys differing from those used by the relay apparatus 100 and the Web server 160.

In consonance with an access request, received from the communication terminal 130, that includes communication system designation information specifying the performance of inter-server communication, the relay apparatus 100 performs inter-server encrypted communication. This access request may be a message, such as a CGI script call, that includes the description "proxy_ssl_assist=on", etc., for instructing that inter-server encrypted communication be performed by the relay apparatus 100. In this case, the URL portion of the access request based on the HTTP protocol may include descriptions of CGI parameters for calling a CGI script and for instructing inter-server encrypted communication.

Instead of this, the extended HTTP header, etc., of the access request based on the HTTP protocol may include the description "proxy_ssl_assist:on", etc., for instructing inter-server encrypted communication.

The inter-server encrypted communication can be further divided into the following two subclasses:

(3-1) Inter-Server Encrypted Communication for which the Web Server 160 does not Perform Authentication for an Access Source With the condition that authentication instruction information, instructing the Web server 160 to perform authentication of an access source, is not included in an access request, the relay apparatus 100 is to perform inter-server encrypted communication without receiving access source authentication (client authentication) as a proxy for the communication terminal 130.

(3-2) Inter-Server Encrypted Communication Whereby the Web Server 160 Performs Authentication for an Access Source With the condition that authentication instruction information, instructing the Web server 160 to perform authentication of an access source, is included in an access source, the relay apparatus 100 receives client authentication as the proxy for the communication terminal 130. In this mode, for example, the access requests may be a message, such as a CGI script call, in which is included as authentication instruction information, a description such as "proxy_authenticate= . . . ", etc.,
instructing the relay apparatus 100 to acquire client authentication, is included in a parameter to be provided for the service program of the Web server 160. In this case, the URL portion of the access request may, based on HTTP protocol, include descriptions of CGI parameters for calling a CGI script and for instructing the acquisition of client authentication.

Instead of this, the extended HTTP header, etc., of the access request may, based on HTTP protocol, include a description to instruct the acquisition of client authentication.

Since the Web server 160 performs client authentication for the relay apparatus 100, and the relay apparatus performs server authentication for the Web server 160, mutual authentication is enabled between the relay apparatus 100 and the Web server 160. The relay apparatus 100 in this mode requests that the authentication server 170 issue ticket information to identify the relay apparatus 100, relative to an access request that instructs the acquisition of client authentication. Here, an access request that includes authentication instruction information may include authentication destination information for identifying the authentication server 170 that should issue ticket information in consonance with the access request. This authentication destination information may be written, for example, as "proxy_authenticate="URL of the authentication server 170"", etc., in correlation with the authentication instruction information. In this case, the relay apparatus 100 requests the issuance of ticket information for the authentication server 170, designated in accordance with the authentication destination information.

The relay apparatus 100 and the authentication server 170 perform mutual authentication prior to issuance of the ticket information. By performing client authentication for the relay apparatus 100, the authentication server 170 can prevent the issue of ticket information to a relay apparatus 100 that is not yet permitted to use a service provided by the Web server 160. As a result, the communication system 10 can indirectly prevent a communication terminal 130 that has not subscribed for a service from receiving a service from the Web server 160.

Based on the contents of an access request, the above described relay apparatus 100 can appropriately switch among non-encrypted communication, end-to-end encrypted communication and inter-server encrypted communication. Further, by performing inter-server encrypted communication, instead of the individual communication terminals receiving client authentication, the relay apparatus 100 can receive client authentication based on temporary ticket information. Thus, the relay apparatus 100 can provide a client authentication function, without administering the client certificates of the individual communication terminals 130 connected to a very confidential, closed network.

Instead of the above arrangement, the relay apparatus 100 may be located on a network, to which both the communication terminals 130 and the Web servers 160 are connected. With this arrangement, the relay apparatus 100 first receives, from a communication terminal 130, an access request addressed to a Web server 160, and transfers the access request to the Web server 160 via the network. Further, the relay apparatus 100 receives, from the Web server 160, an access reply to the access request, and transfers the access reply to the communication terminal 130 via the network.

The configuration of the relay apparatus 100 according to this mode is shown in FIG. 2. The relay apparatus 100 includes: an access request receiver 200, a request monitoring unit 205, a confirmation request transmitter 220, a confirmation reply receiver 225, an authentication information acquisition unit 210, a ticket information acquisition unit 215, a service information storage unit 230, a gateway application processor 235, an access request transmitter 240, an access reply receiver 245, a reply monitoring unit 250, a link change instruction information acquisition unit 255, a content converter 260 and an access reply transmitter 265.

The access request receiver 200 receives from a communication terminal 130 an access request addressed to a Web server 160. Based on the contents of the access request, i.e., based, for example, on communication system designation information, the request monitoring unit 205 selects which of non-encrypted communication, end-to-end encrypted communication and inter-server encrypted communication should be employed for communication, and performs a request process in consonance with the selected communication system. Here, in a case for the performance of non-encrypted communication or inter-server encrypted communication, the request monitoring unit 205 transfers the access request to the gateway application processor 235 in order to deliver the access request, via the gateway application processor 235 and the access request transmitter 240, to the Web server 160.

With the condition that, when performing inter-server encrypted communication, the confirmation request transmitter 220 request that the user of the communication terminal 130 confirm whether the relay apparatus 100 has received client authentication by the Web server 160. More specifically, upon receiving an access request issued by the communication terminal 130, the confirmation request transmitter 220 transmits a confirmation request to the communication terminal 130 to permit the user of the communication terminal 130 to confirm whether authentication for the relay apparatus 100, by the Web server 160, has been requested.

The confirmation reply receiver 225 receives from the communication terminal 130 a confirmation reply, relative to the confirmation request, that includes confirmation results for the user, and receives an instruction as to whether the relay apparatus 100 should receive client authentication by the Web server 160. Upon receiving the confirmation request, the request monitoring unit 205 determines whether authentication for the relay apparatus 100 is to be performed by the Web server 160.

The service processes available for the relay apparatuses 100, i.e., the service processes that individual Web servers 160 should perform upon receiving access requests from communication terminals 130, are stored in the service information storage unit 230. More specifically, in the service information storage unit 230, communication system permission information, authentication permission information and confirmation permission information are stored, in correlation with service identification information that identifies the individual service processes. The communication system permission information designates a communication system that can be employed for the service process. The authentication permission information indicates whether or not client authentication by a Web server 160 is permitted for the service process. The confirmation permission information indicates whether or not a confirmation request for client authentication by the Web server 160 should be transmitted to the communication terminal 130.

In a case for the performance of inter-server encrypted communication, the authentication information acquisition unit 210 obtains authentication instruction information indicating authentication of an access resource is required, with the condition that the authentication instruction information be included in an access request received from the communication terminal 130. It should be noted that, with the condition that authentication of the relay apparatus 100 by the Web server 160 not be permitted, the request monitoring unit 205 inhibits the above described operation of the authentication information acquisition unit 210. The ticket information acquisition unit 215 obtains ticket information from the external authentication server 170, based on the authentication instruction information obtained by the authentication information acquisition unit 210. This ticket information is, for example, a one-time password, and identification information that is allocated by the authentication server 170, regardless of identification information for the communication terminal 130, in order to identify the relay apparatus 100 in consonance with the access request. In this mode, the ticket information acquisition unit 210 performs mutual authentication with the external authentication server 170, and obtains ticket information.

With the condition that non-encrypted communication or inter-server encrypted communication be performed, the gateway application processor 235 performs data conversion, i.e., performs, for example, content conversion or the like for an access request and/or an access reply transmitted by the communication terminal 130 and the Web server 160. For example, the gateway application processor 235 performs a conversion process, e.g., changes a web page on the Web server 160, which is prepared for a personal computer, to one for the communication terminal 130, which is a mobile phone. It should be noted that for end-to-end communication, as in patent document 2, the gateway application processor 235 may obtain in advance the decryption key used for the relay apparatus 100 and the Web server 160, and may perform data conversion for an access request and an access reply using transcoding.

The access request transmitter 240 receives, via the gateway application processor 235, an access request that is output via the request process performed by the request monitoring unit 205. And the access request transmitter 240 transmits the access request to the Web server 160 via the second network 150. Here, with the condition that inter-server encrypted communication be performed, the access request transmitter 240 encrypts an access request and transmits the encrypted access request to the Web server 160. It should be noted that, in a case of acquisition of client authentication by the Web server 160, the access request transmitter 240 encrypts an access request and ticket information, obtained by the ticket information acquisition unit 215, and transmits the encrypted access request and encrypted ticket information to the Web server 160.

The access reply receiver 245 is an example access reply decryption unit according to this invention, and receives an access reply from the Web server 160 for the access request. And the access reply receiver 245 decodes the access reply to the access request that was issued by employing the inter-server encrypted communication. Here, the access reply received by the access reply receiver 245 includes, for example, a document, such as an HTML one, to display the processing results for the service process on the communication terminal 130, and/or contents that were accessed and the like. The document, the contents, etc., may include link information to request an access for another document and/or contents, etc., i.e., may include, for example, a hyperlink, a script call using a CGI, etc. When, for example, a user designates link information, the communication terminal 130 transmits, to the Web server 160, an access request for a document or for contents designated in the link information.

The reply monitoring unit 250 performs the access reply process based on the communication system and the contents of the access reply. More specifically, the reply monitoring unit 250 analyzes the header and the contents of an access reply to an access request that was issued by employing non-encrypted communication or inter-server encrypted communication. On the other hand, for an access reply to an access request that was issued by employing end-to-end encrypted communication, the reply monitoring unit 250 transfers it to the content converter 260, without analyzing the contents.

With the condition that link change instruction information be included in the header or the contents of an access reply, the link change instruction information acquisition unit 255 obtains the link change instruction information. This link change instruction information can include: inter-server encryption instruction information, which instructs a change in link information, so that the relay apparatus 100 and the Web server 160 perform inter-server encrypted communication relative to an access request issued to a linking destination for a document or contents; or mutual authentication instruction information, which instructs a change in each set of link information, so that ticket information can be obtained relative to an access request issued to a linking destination for a document or contents, and the relay apparatus 100 and the Web server 160 perform mutual authentication.

As the link change instruction information is obtained, the content converter 260 changes link information, for a document or contents, that is received using the access reply. That is, as the inter-server encryption instruction information is obtained, the content converter 260 converts link information, which is included in the contents to instruct encrypted communication, into link information to instruct inter-server encrypted communication. And as accessing the link information is instructed, the communication terminal 130 transmits an access request to the relay apparatus 100 instructing the relay apparatus 100 to perform inter-server encrypted communication.

Further, with the condition that the mutual authentication instruction information be obtained, the content converter 260 converts link information, included in the contents, into link information for instructing the performance of mutual authentication for the relay apparatus 100 and the Web server 160. Thus, in association with the instruction of the access of the link information, the communication terminal 130 transmits, to the relay apparatus 100, an access request that includes authentication instruction information and that instructs the acquisition of ticket information from the authentication server 170.

The access reply transmitter 265 accepts an access reply that is received by the access reply receiver 245 and that is converted, as needed, by the reply monitoring unit 250, the link change instruction information acquisition unit 255, the content converter 260 and the gateway application processor 235, and transmits the access reply to the communication terminal 130 via the first network 110.

The operation flowchart for the relay apparatus 100, according to this mode, is shown in FIG. 3.

First, the access request receiver 200 receives from A communication terminal 130 an access request addressed to a Web server 160 (step S300). Then, the request monitoring unit 205 selects a communication system based on the contents of the access request, i.e., based, for example, on communication system designation information (S305). It should be noted that the access request may also include service identification information, for identifying a service process that the Web server 160 should perform in accordance with the access request. In this case, the request monitoring unit 205 reads communication system permission information that is stored in the service information storage unit 230, in correlation with the service identification information that is included in the access request, and employs the communication system, with the condition that use of the selected system be permitted, based on the contents of the access request.

Following this, the relay apparatus 100 performs the following processing in consonance with the individual communication systems, i.e., non-encrypted communication, end-to-end encrypted communication and inter-server encrypted communication.

(1) Non-Encrypted Communication

With the condition that the non-encrypted communication system be selected, the request monitoring unit 205 transfers the access request to the gateway application processor 235. The gateway application processor 235 performs necessary data conversion, in consonance with the access request. Then, the access request transmitter 240 transmits to a destination Web server 160 the access request received from the gateway application processor 235, without encrypting it (S310).

Sequentially, the access reply receiver 245 receives a plaintext access reply from the Web server 160, relative to the access request, and transfers the access reply to the reply monitoring unit 250. The processing then advances to S355 (S315).

(2) End-to-End Encrypted Communication

With the condition that end-to-end encrypted communication be selected, the request monitoring unit 205 transfers, to the gateway application processor 235, a connection request message that is included as part of the access request. Upon receiving the connection request message, the gateway application processor 235 exchanges a message with the Web server 160 via the access request transmitter 240 and the access reply receiver 245, and establishes a connection, such as a TCP connection, with the Web server 160 (S317). After the connection has been established, the gateway application processor 235 transmits a connection reply message to the communication terminal 130 via the access reply transmitter 265.

Next, the communication terminal 130 and the Web server 160 exchange, via the relay apparatus 100, data for establishing an encrypted communication path. That is, for example, with the condition that an SSL connection be performed, the communication terminal 130 transmits an "SSL Client Hello" message, and receives, from the Web server 160, an "SSL Server Hello" message, a server certificate and a "Server Hello Done" message. Then, the communication terminal 130 transmits a "Change Cipher Spec" message and a "Finish" message. Thereafter, the communication terminal 130 receives "Change Cipher Spec" and "Finish" messages from the Web server 160. In this manner, encrypted communication is established between the communication terminal 130 and the Web server 160 (S318).

Thereafter, the communication terminal 130 transmits, to the relay apparatus 100, an encrypted access request for accessing a document, contents, etc., in the Web server 160. The access request is transferred to the access request transmitter 240 via the request monitoring unit 205 and the gateway application processor 235. The access request transmitter 240 then transmits the access request to the Web server 160, even though the relay apparatus 100 does not encrypt the access request, which does not instruct inter-server encrypted communication, but instructs the performance of end-to-end encrypted communication between the communication terminal 130 and the Web server 160 (S320).

Thereafter, the access reply receiver 245 receives from the Web server 160 an access reply to the access request (S325). The access reply receiver 245 transmits the access reply to the communication terminal 130, without decrypting it (S360).

(3) Inter-Server Encrypted Communication

In a case wherein inter-server encrypted communication is selected, with the condition that authentication instruction information, for instructing that the Web server 160 authenticate an access source, be included in the access request, i.e., is included, for example, in a parameter included in the access request, the authentication information acquisition unit 210 obtains the authentication instruction information, and the processing advances to S335 (S330). Furthermore, with the condition that authentication instruction information and authentication destination information be included in the access request, the authentication information acquisition unit 210 also obtains authentication destination information from the access request. Then, the access request transmitter 220 transmits a confirmation request to the communication terminal 130, and the confirmation reply receiver 225 receives the confirmation reply (S335).

Here, in consonance with a service process corresponding to the access request, the confirmation request transmitter 220 may determine whether the confirmation request should be transmitted to the communication terminal 130. More specifically, in the service information storage unit 230, confirmation permission information, for designating whether or not transmission of a confirmation request to the communication terminal 130 should be permitted, is stored in correlation with service identification information. And with the condition that "permitted" be designated for the confirmation permission information that is correlated with service identification information, which is included in the access request that instructs the performance of inter-server encrypted communication, the request monitoring unit 205 permits the confirmation request transmitter 220 to transmit a confirmation request. Therefore, the confirmation request transmitter 220 can transmit a confirmation request to the communication terminal 130, with the condition that confirmation permission information, permitting transmission of a confirmation request to the communication terminal 130, be stored in correlation with service identification information included in an access request. As a result, the confirmation reply receiver 225 receives a confirmation reply from the communication terminal 130. On the other hand, with the condition that "inhibited" be designated for the confirmation permission information, the confirmation request transmitter 220 does not transmit a confirmation request to the communication terminal 130.

Next, with the condition that authentication instruction information be included in an access request, and that the Web server 160 perform authentication for an access source in consonance with the access request, the ticket information acquisition unit 215 obtains, for the access request, ticket information from the authentication server 170 to identify the relay apparatus 100 (S340). This ticket information is employed by the Web server 160 in order to authenticate an access source. At this time, with the condition that authentication destination information be designated, the ticket information acquisition unit 215 obtains ticket information from the authentication server 170 designated in accordance with the authentication destination information.

At S340, upon receiving a confirmation reply, relative to the access request, indicating that authentication for the relay apparatus 100 should be performed by the Web server 160, the ticket information acquisition unit 215 obtains ticket information from the authentication server 170 in accordance with an instruction from the request monitoring unit 205. Further, with the condition that confirmation permission information, indicating that transmission of a confirmation request to the communication terminal 130 not be permitted, be stored in the service information storage unit 230 in correlation with service identification information included in the access request, the ticket information acquisition unit 215 obtains ticket information from the authentication server 170, and is authenticated by the Web server 160, without obtaining a confirmation from the user. Here, prior to the acquisition of ticket information, the ticket information acquisition unit 215 mutually performs authentication with the authentication server 170, and obtains ticket information through encrypted communication.

At S335 and S340, with the condition that authentication permission information, indicating the acquisition of ticket information is permitted, be stored in the service information storage unit 230 in correlation with service identification information included in the access request, the ticket information acquisition unit 215 may obtain ticket information from the authentication server 170. Thus, only for a service for which the relay apparatus 100 is subscribed can the relay apparatus 100 receive ticket information, and gain client authentication.

Sequentially, the request monitoring unit 205 transfers the access request and the ticket information, obtained by the ticket information acquisition unit 215, to the access request transmitter 240 via the gateway application processor 235. Following this, the access request transmitter 240 establishes an encrypted communication path with the Web server 160. With the condition that the Web server 160 perform authentication for an access source in consonance with the access request, the access request transmitter 240 encrypts the access request and the ticket information and transmits them to the Web server 160 (S345).

On the other hand, with the condition that authentication instruction information not be included in the access request, and that the Web server 160 not perform authentication for an access source in consonance with the access request, the access request transmitter 240 encrypts the access request and transmits the encrypted access request to the Web server 160 (S345). Thus, as for an access request indicating that inter-server encrypted communication should be performed but that client authentication is not required, the access request transmitter 240 can transmit this access request to the Web server 160, without acquiring ticket information.

Following this, the access reply receiver 245 receives and decrypts the encrypted access reply that was transmitted by the access request transmitter 240 relative to the access request (S350). Here, in a case wherein client authentication is performed, the access reply receiver 245 receives an encrypted access reply, relative to the access request, from the Web server 160 that has authenticated the relay apparatus 100 using ticket information, and decrypts the encrypted access reply.

In the above described cases (1) and (3), the access reply receiver 245 receives and decrypts the access reply, and transfers the decrypted access reply to the reply monitoring unit 250. Based on the access reply, the reply monitoring unit 250, the link change instruction information acquisition unit 255 and the content converter 260 change, as needed, received link information for a document or contents (S355). That is, the reply monitoring unit 250 analyzes the header and the contents of the access reply. The link change instruction information acquisition unit 255 obtains link change instruction information included in the header or the contents of the access reply. And the content converter 260 employs the link change information to change link information included in a document or contents received using the access reply.

More specifically, information to be included in an access request, which the communication terminal 130 should transmit in consonance with the selection of link information for a document or contents, is written in the link information. With the condition that the access reply include inter-server encrypted communication instruction information, the content converter 260 changes the link information, so that the access request issued to the link destination includes communication system instruction information indicating that inter-server encrypted communication should be performed. Further, with the condition that the access reply include mutual authentication instruction information, the content converter 260 changes link information, so that an access request to a link destination includes authentication instruction information, or authentication instruction information and authentication destination information. The access reply, for which the link information is changed, is transferred to the access reply transmitter 265 via the gateway application processor 235.

According to this mode, the extended HTTP header of the access reply may include the description "ssl_conversion: to_proxy_ssl_assist . . . " as inter-server encryption instruction information, or instead, may include the above description as the substance of a document or contents. Further, for the access reply, mutual authentication instruction information may be included in the " . . . " portion of the inter-server encryption instruction information.

And the content converter 260 changes all sets of link information, so that, with the condition that at least one set of inter-server encryption instruction information be written in the access reply, inter-server encrypted communication is to be designated upon receiving an access request relative to all the link information indicating the performance of encrypted communication. For example, description "https:// . . . ", instructing transmission of an access request using the HTTPS protocol is changed to the description "http:// . . . ", instructing transmission of an access request using HTTP protocol, and "proxy_ssl_assist=on" is added to a CGI parameter. Furthermore, with the condition that mutual authentication instruction information be included in the access reply, the content converter 260 changes link information indicating inter-server encrypted communication to link information indicating an instruction for client authentication. That is, for example, the content converter 260 adds description "proxy_path_authenticate=~" to the CGI parameter for link information.

In addition, relative to the access request transmitted to a link destination, the access reply may include, as link change instruction information, end-to-end encrypted communication designation information, instructing the performance of end-to-end encrypted communication. In this case, the content converter 260 changes all the link information instructing the performance of inter-server encrypted communication, to link information instructing the performance of end-to-end encrypted communication. For example, "http:// . . . ", instructing inter-server encrypted communication, is changed to "https:// . . . ", and description "proxy_ssl_assist=on" is deleted from a CGI parameter.

When the processes at S325 and S355 are completed, the access reply transmitter 265 transmits, to the communication terminal 130, an access reply received via the gateway application processor 235.

According to the relay apparatus 100 described above, based on link change instruction information, link information can be changed so that communication system designation information that designates inter-server encrypted communication, communication system designation information that designates end-to-end encrypted communication, and/or authentication instruction information, included in the access request, that correspond to individual link information for the access reply. Therefore, the administrator of the Web server 160 need only write link change instruction information in the header of an access reply, or in one place in each document or in contents, so that all the link information can be collectively changed by the relay apparatus 100.

The non-encrypted communication sequence performed by the communication system 10 according to this mode is shown in FIG. 4.

First, in consonance with the selection of link information that, for example, includes "http:// . . . " and does not include "proxy_ssl_assist=on", the communication terminal 130 transmits an access request message 400 to the relay apparatus 100. Since the access request includes "http:// . . . " and does not include "proxy_ssl_assist=on", the request monitoring unit 205 of the relay apparatus 100 selects non-encrypted communication. As a result, the relay apparatus 100 does not encrypt the access request message 400, and transmits it as an access request message 410 to the Web server 160.

In response to the access request message 410, the Web server 160 transmits an access reply message 420 that includes a document, or contents that are targets for the access request message 410. Upon receiving the access reply message 420, the reply monitoring unit 250 of the relay apparatus 100 analyzes the access reply message 420. With the condition that link change instruction information be included in the access reply message 420, the link change instruction information acquisition unit 255 obtains the link change instruction information. With the condition that the link change instruction information be obtained, the content converter 260 changes individual link information included in the access reply in accordance with the link change instruction information.

With the condition that inter-server encrypted communication designation information be obtained as link change instruction information, the content converter 260 changes link information designating the performance of encrypted communication between the communication terminal 130 and the Web server 160, to link information indicating that an access request should be transmitted, by the communication terminal 130, to instruct the performance of inter-server encrypted communication in consonance with a selection made by a user of the communication terminal 130.

Further, with the condition that mutual authentication instruction information be obtained as link change instruction information, the content converter 260 changes individual link information for the contents to link information indicating that a first access request, including authentication instruction information, should be transmitted by the communication terminal 130 in consonance with a selection made by the user of the communication terminal 130. That is, for example, with the condition that a URL requesting a CGI script call be written as a link destination, the content converter 260 performs conversion, so that, as authentication instruction information, the description "proxy_path_authenticate= . . . " is included in the CGI parameter.

Furthermore, with the condition that end-to-end encrypted communication designation information be obtained as link change instruction information, the content converter 260 changes link information designating the performance of encrypted communication, to link information indicating that an access request instructing end-to-end encrypted communication should be transmitted by the communication terminal 130 in consonance with a selection made by the user of the communication terminal 130.

And the access reply transmitter 265 receives, via the gateway application processor 235, an access reply that includes a document or contents for which link information has been changed as needed, and transmits this access reply as an access reply message 430 to the communication terminal 130, which is an access source.

The end-to-end encrypted communication sequence performed by the communication system 10 according to this mode is shown in FIG. 5.

In consonance with the selection of link information that, for example, includes "https:// . . . " and designates the transmission of an access request instructing end-to-end encrypted communication, the communication terminal 130 transmits, to the relay apparatus 100, an access request that instructs end-to-end encrypted communication. As an example, as an access reply to an access request that was transmitted by the communication terminal 130 to the Web server 160 prior to the access request in FIG. 5, the relay apparatus 100 receives a document or contents that are targets for the access request. Then, with the condition that the access reply include end-to-end encrypted communication designation information, the content converter 260 of the relay apparatus 100 changes link information, which is included in the document or the contents to designate encrypted inter-server communication, to link information to designate end-to-end encrypted communication. In this case, the communication terminal 130 later transmits an access request to designate end-to-end encrypted communication.

An access request for instructing end-to-end encrypted communication includes: a connection request message 500, which is transmitted to establish a connection between the connection terminal 130 and the Web server 160; a message to establish an encrypted communication path; and an access request message 540. First, the communication terminal 130 transmits the connection request message in order to establish a connection with the Web server 160. Upon receiving the connection request message 500, the relay apparatus 100 establishes a connection 510 with the Web server 160. When the connection is established, the relay apparatus 100 transmits a connection reply message 520 to the communication terminal 130. Sequentially, the relay apparatus 100 is set so that the transfer of messages is to be performed for the communication terminal 130 and the Web server 160, without changing the contents of the messages. As a result, the communication terminal 130 and the Web server 160 exchange messages directly and straightforwardly, while taking the presence of the relay apparatus 100 into account.

Following this, the communication terminal 130 and the Web server 160 exchange messages to establish an encrypted communication 530, for example, for an SSL connection or the like. Through this, the communication terminal 130 and the Web server 160 designate a communication path for performing end-to-end encrypted communication. Sequentially, the communication terminal 130 transmits an encrypted access request message 540 to the Web server 160, via the relay apparatus 100. Then, the Web server 160 transmits an encrypted access reply message 550 to the communication terminal 130, via the relay apparatus 100.

The inter-server encrypted communication sequence performed by the communication system 10 according to this mode is shown in FIG. 6.

First, in consonance with the selection of link information that, for example, includes "http:// . . . ", "proxy_ssl_assist=on" and "proxy_path_authenticate= . . . ", and that designates transmission of an access request, which instructs the performance of inter-server encrypted communication and client authentication, the communication terminal 130 transmits, to the relay apparatus 100, an access request message 600 that instructs the performance of inter-server encrypted communication and client authentication.

As an example reply access relative to an access request that is transmitted by the communication terminal 130 to the Web server 160 prior to an access request shown in FIG. 6, the relay apparatus 100 receives a document or contents that are targets for the access request. Then, with the condition that the access reply include inter-server encrypted communication designation information, the content converter 260 of the relay apparatus 100 changes link information included in the document or the contents to designate encrypted communication, to link information designating inter-server encrypted communication. In this case, the communication terminal 130 transmits an access request that instructs inter-server encrypted communication.

Furthermore, with the condition that authentication instruction information be included in an access reply that is received prior to the access request shown in FIG. 6, the link information included in the document or the contents to designate encrypted communication is changed to link information designating that client authentication should be performed upon receiving ticket information issued by the authentication server 170. In this case, the communication terminal 130 transmits an access request that instructs the acquisition of ticket information for inter-server encrypted communication.

Sequentially, with the condition that the access request includes authentication instruction information "proxy_path_authenticate= . . . ", and that confirmation permission information, indicating that confirmation by a user is permitted for a service corresponding to the access request, is stored in the service information storage unit 230, the confirmation request transmitter 220 of the relay apparatus 100 transmits a confirmation request message 602 to the communication terminal 130. Upon receiving the confirmation request message 602, the communication terminal 130 transmits a confirmation reply message 604.

Following this, the ticket information acquisition unit 215 establishes an encrypted communication 610 by performing mutual authentication with the authentication server 170, and thereafter, transmits a ticket information request message 620 to the authentication server 170 requesting ticket information. Upon receiving this message, the authentication server 170 transmits ticket information using a ticket information reply message 630.

Next, the relay apparatus 100 and the Web server 160 establish an encrypted communication 640 to establish an encrypted communication path. Then, the relay apparatus 100 transmits an access request message 650, including the access request message 600 and the ticket information, to the Web server 160. Thereafter, the relay apparatus 100 receives an access reply message 660 relative to the access request message 650.

The access reply receiver 245 of the relay apparatus 100 decrypts the received access reply message 660. With the condition that the access reply message 660 include link change instruction information, the content converter 260 employs the link change instruction information to change the individual link information included in the access reply message 660. And the access reply transmitter 265 transmits, as an access reply message 670, the access reply message 660 which has been decrypted by the access reply receiver 245 and for which link information has been changed by the content converter 260.

A modification of the inter-server encrypted communication sequence performed by the communication system according to this mode is shown in FIG. 7.

In a case wherein a cascade connection of a plurality of relay apparatuses 100 is provided, a relay apparatus 100, designated by the user of the communication terminal 130, obtains client authentication upon receiving ticket information that is issued.

First, in the same manner as in FIG. 6, the communication terminal 130 transmits, to a first relay apparatus 100, an access request message 600 including an access request that includes communication system designation information, designating inter-server encrypted communication, and authentication instruction information. Then, in the same manner as in FIG. 6, the first relay apparatus 100 transmits a confirmation request message 602 to the communication terminal 130, and receives a confirmation reply message 604 from the communication terminal 130. Here, with the condition that the user of the communication terminal 130 not instruct the Web server 160 to authenticate the first relay apparatus 100, the first relay apparatus 100 does not obtain ticket information, and transmits an access request message 700 to a second relay apparatus 100.

In the same manner as in FIG. 6, the second relay apparatus 100 transmits a confirmation request message 702 to the communication terminal 130, and receives a confirmation reply message 704 from the communication terminal 130. With the condition that the user of the communication terminal 130 instruct the Web server 160 to authenticate the second relay apparatus 100, the second relay apparatus 100 establishes encrypted communication 610 with the authentication server 170 in the same manner as in FIG. 6. Then, the second relay apparatus 100 transmits a ticket information request message 620 to the authentication server 170 and receives ticket information reply message 630 from the authentication server 170 to obtain ticket information.

Thereafter, the communication terminal 130, the Web server 160 and the relay apparatuses 100 perform inter-server encrypted communication in the same manner as for the ticket information reply message 630, the established encrypted communication 640, the access request message 650, the access reply message 660 and the access reply message 670 in FIG. 6, so that an access reply message 670 is transmitted to the communication terminal 130.

According to the above described inter-server encrypted communication sequence, client authentication can be received by one of a plurality of relay apparatuses 100 that is selected by the user of the communication terminal 130. Here, as described by referring to FIG. 3, a relay apparatus 100 that is not subscribed for a target service for an access request does not transmit a confirmation request to the communication terminal 130. Therefore, based on a confirmation request, the user of the communication terminal 130 can appropriately select a relay apparatus 100 that should obtain client authentication.

The sequence of the communication system 10 according to this mode for preparing for generation of ticket information is shown in FIG. 8. First, the gateway application processor 235 of the relay apparatus 100 transmits a certificate issue request message 800 to the certification authority 180 to request the issue of a certificate for the relay apparatus 100. Upon receiving the certificate issue request message 800, the certification authority 180 issues a certificate for the relay apparatus 100, and notifies the relay apparatus 100 to that effect, using a certificate issue reply message 810.

Sequentially, the relay apparatus 100 transmits a certification authority registration message 820 to the authentication server 170 in order to register, at the authentication server 170, the certification authority 180 that authenticates the relay apparatus 100. Then, the relay apparatus 100 transmits, to the Web server 160, an ID character string registration message 830, indicating a character string (ID character string) that specifies the relay apparatus 100 that was employed for the creation of the certificate for the relay apparatus 100, and registers the ID character string at the Web server 160. Following this, the Web server 160 transmits, to the authentication server 170, a SEED character string registration message 840 that includes the ID character string, registered by the relay apparatus 100, and a SEED character string, generated by the Web server 160, and registers the pair comprising the ID character string and the SEED character string at the authentication server 170.

As a result of the above processing, the authentication server 170 holds the ID character string and the SEED character string. Then, when a request to issue ticket information is transmitted by the relay apparatus 100, the authentication server 170 encrypts information, including the ID character string and the SEED character string, by employing the encryption key of the authentication server 170, and generates ticket information. On the other hand, when the Web server 160 receives ticket information from the relay apparatus 100 for client authentication, the Web server 160 decrypts the ticket information using the decryption key of the authentication server 170, and confirms the matching of the ID character string and the SEED character string, so that the relay apparatus 100 can be correctly authenticated.

An example configuration for a computer 1900 according to this mode is shown FIG. 9. The computer 1900 according to this mode functions as a relay apparatus 100 by executing a program for the relay apparatus 100. The computer 1900 comprises: a CPU peripheral section, including a CPU 2000, a RAM 2020, a graphic controller 2075 and a display device 2080 that are interconnected by a host controller 2082; an input/output section, including a communication interface 2030, a hard disk drive 2040 and a CD-ROM drive 2060 that are connected to the host controller 2082 by an input/output controller 2084; and a legacy input/output section, including a ROM 2010, a flexible disk drive 2050 and an input/output chip 2070 that are connected to the input/output controller 2084.

The host controller 2082 connects the RAM 2020 to the CPU 2000, which accesses the RAM 2020 at a high transfer rate, and the graphic controller 2075. The CPU 2000 is operated based on programs stored in the ROM 2010 and the RAM 2020, and controls the individual sections. The graphic controller 2075 obtains image data that the CPU 2000 or the like generates in a frame buffer in the RAM 2020, and displays as image data on the display device 2080. Instead of this, the graphic controller 2075 may internally include a frame buffer for storing image data generated by the CPU 2000 or the like.

The input/output controller 2084 connects the host controller 2082 to the communication interface 2030, which is a comparatively fast input/output device, the hard disk drive 2040 and the CD-ROM drive 2060. The communication interface 2030 communicates with an external device via a network. The hard disk drive 2040 stores programs and data used by the CPU 2000 of the computer 1900. And the CD-ROM drive 2060 reads programs or data from a CD-ROM 2095 and provides the programs or data for the hard disk drive 2040.

Further, the ROM 2010 and comparatively slow input/output devices, such as the flexible disk drive 2050 and the input/output chip 2070, are connected to the input/output controller 2084. A boot program that is executed when the computer 1900 is activated, programs that depend on the hardware of the computer 1900, etc., are stored in the ROM 2010. The flexible disk drive 2050 reads a program or data from a flexible disk 2090, and provides the program or the data for the hard disk drive 2040, via the RAM 2020. And the input/output chip 2070 connects the flexible disk drive 2050, or various types of input/output devices, via a parallel port, a serial port, a keyboard port and a mouse port, for example.

A program provided for the computer 1900, via the RAM 2020, is recorded on a flexible disk 2090, in the CD-ROM 2095 or on another recording medium, such as an IC card, and is to be employed by a user. The program is read from a recording medium, is installed on the hard disk drive 2040 of the computer 1900, and is executed by the CPU 2000.

The program, which is installed in the computer 1900 and permits the computer 1900 to serve as the relay apparatus 100, includes: an access request reception module, a request monitoring module, an authentication information acquisition module, a ticket information acquisition module, a confirmation request transmission module, a confirmation reply reception module, a service information management module, a gateway application processing module, an access request transmission module, an access reply reception module, a reply monitoring module, a link change instruction information acquisition module, a content conversion module and an access reply transmission module.

The program or these modules operate the CPU 2000 and the like, and permit the computer 1900 to serve separately as: the access request receiver 200, the request monitoring unit 205, the authentication information acquisition unit 210, the ticket information acquisition unit 215, the confirmation request transmitter 220, the confirmation reply receiver 225, the service information storage unit 230, the gateway application processor 235, the access request transmitter 240, the access reply receiver 245, the reply monitoring unit 250, the link change instruction information acquisition unit 255, the content converter 260 and the access reply transmitter 265.

The above described program and modules may be stored on an external storage medium. This storage medium may not only be a flexible disk 2090 or a CD-ROM 2095, but can also be an optical recording medium, such as a DVD or a CD, a magneto-optical recording medium, such as an MO, a tape medium, or a semiconductor memory, such as an IC card. Furthermore, a storage device, such as a hard disk or a RAM, provided for a server system connected to a special communication network or the Internet may be employed as a recording medium. And a program may be provided for the computer 1900, via the network.

The present invention has been described by employing the mode. However, the technical scope of the present invention is not limited to the scope described in this mode, and it will be obvious to one having ordinary skill in the art that the mode can be variously modified or improved. As is apparent from the claims of the invention, such modifications or improvements can also be included within the technical scope of the invention.

DESCRIPTION OF THE REFERENCE NUMERALS AND SIGNS

Figure 1:
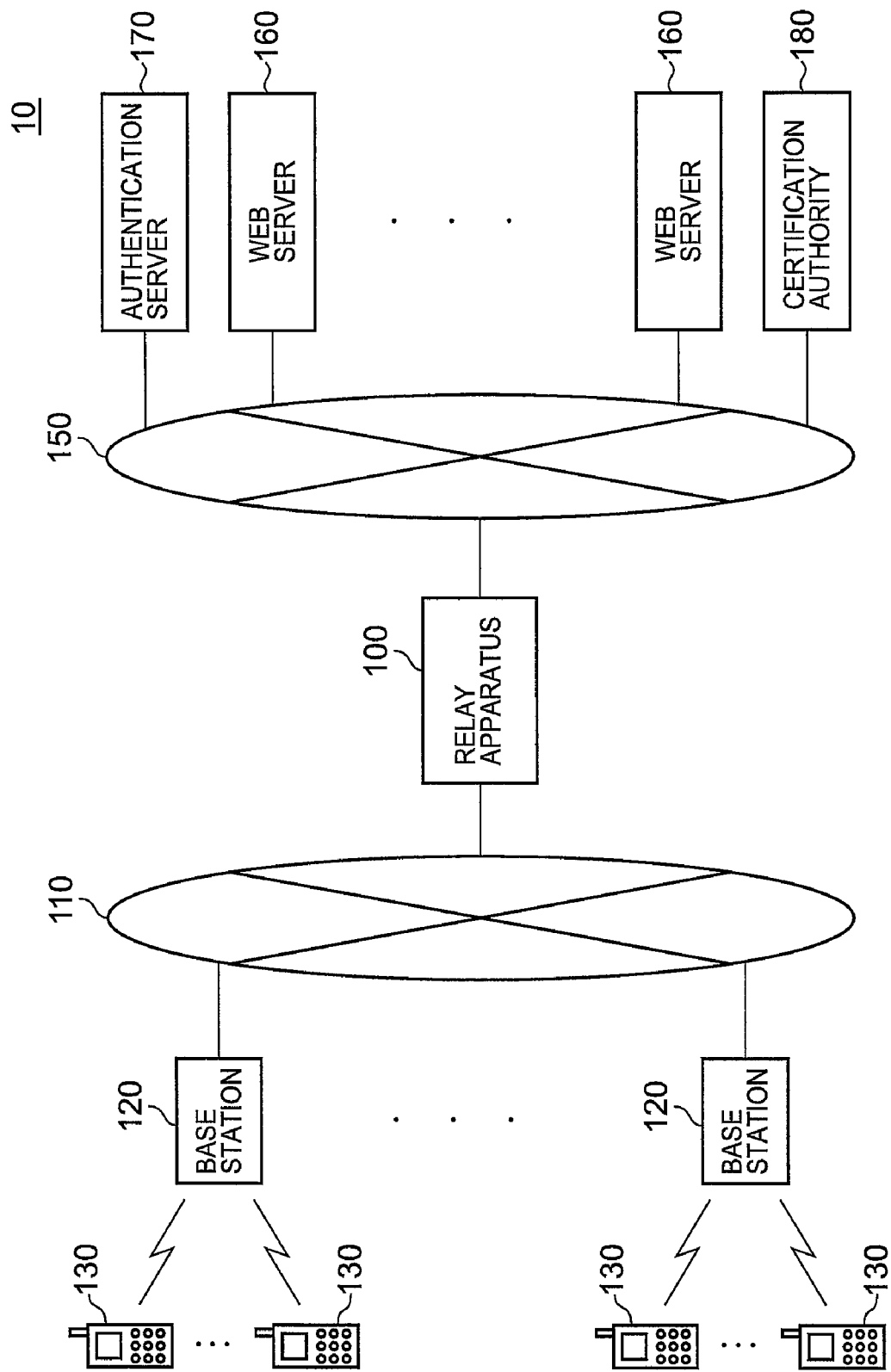
FIG. 1 This illustrates the configuration of a communication system 10 according to one mode of the present invention.
Figure 2:
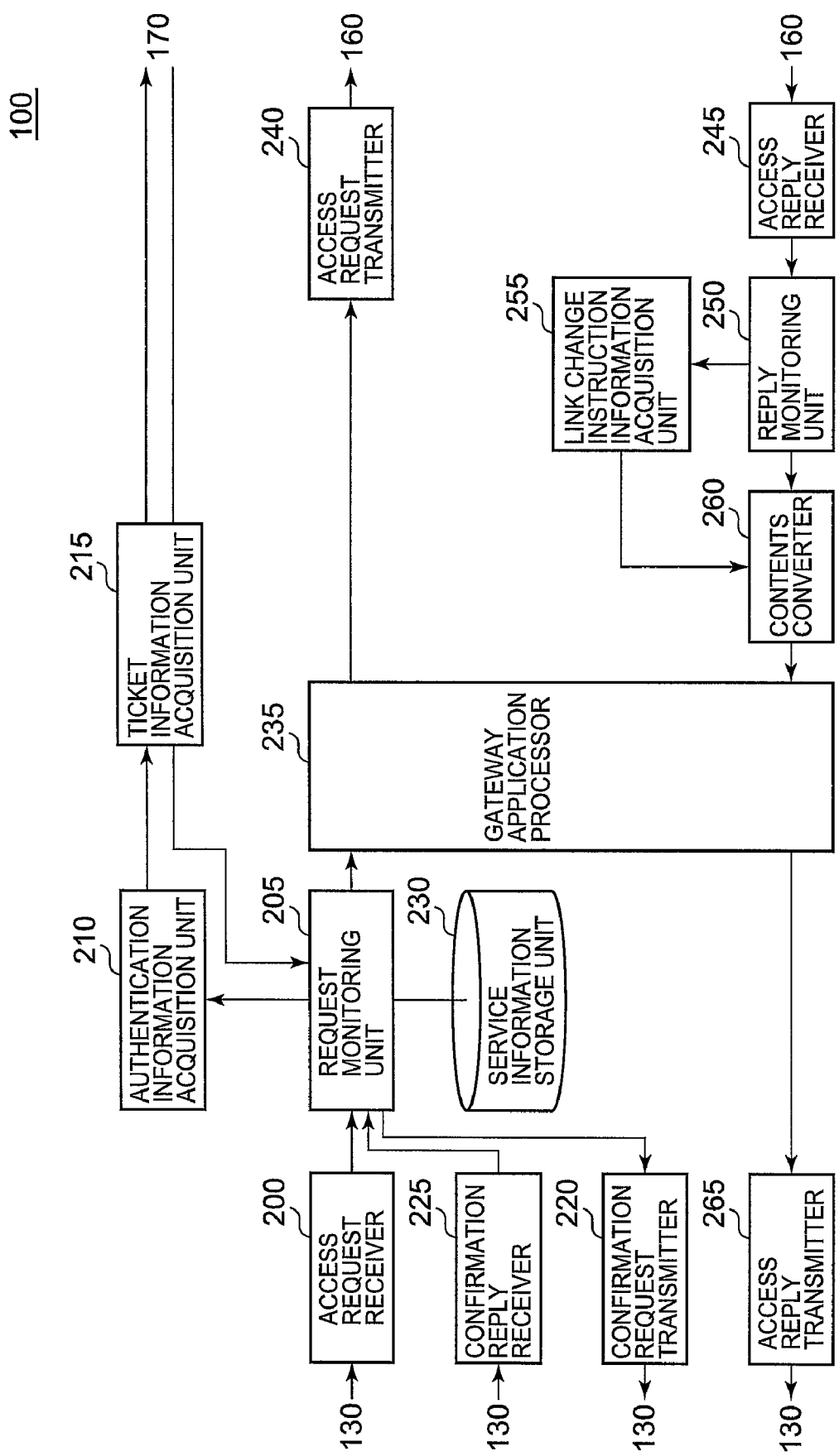
FIG. 2 This illustrates the configuration of a relay apparatus 100 according to the mode of the present invention.
Figure 3:
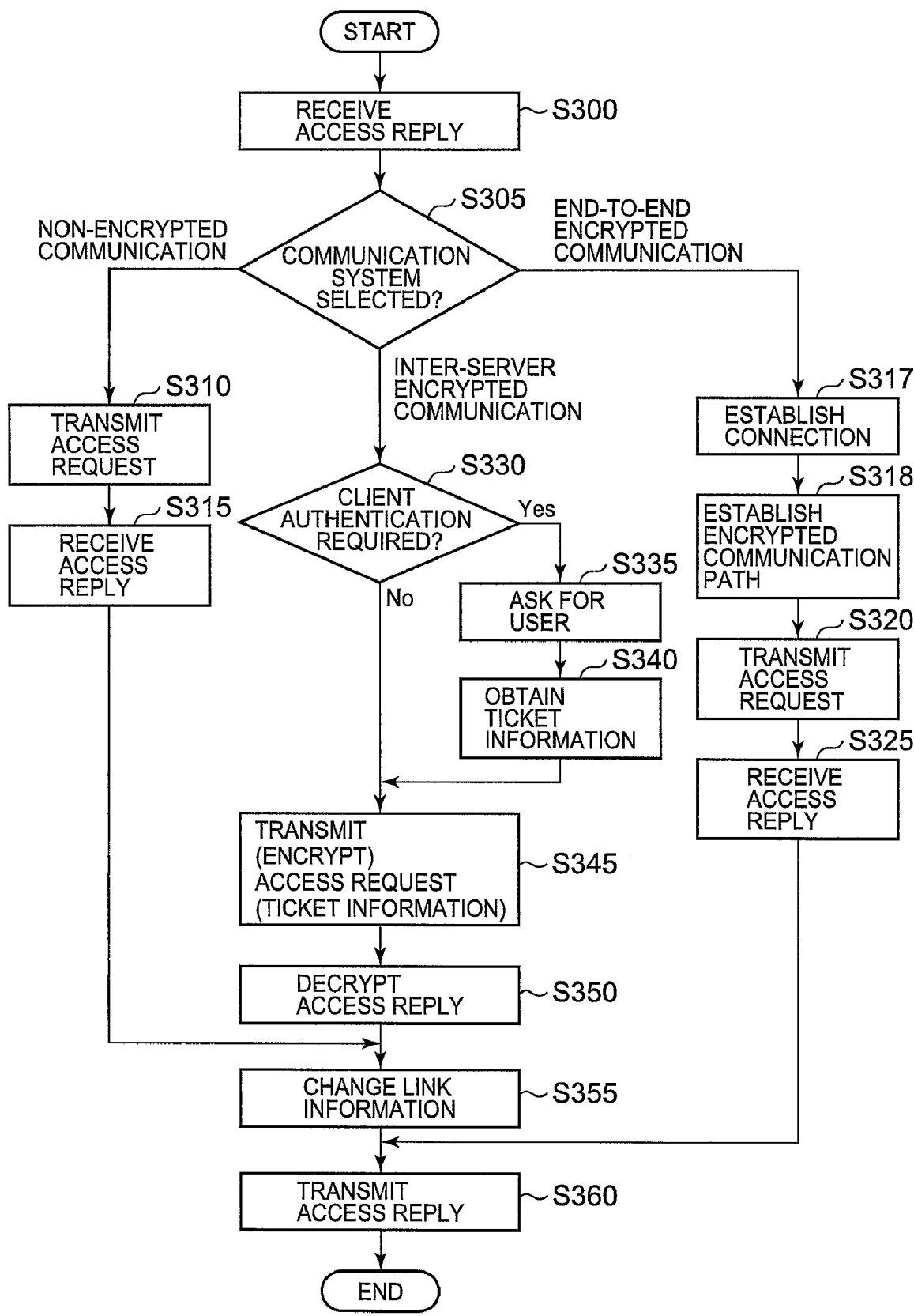
FIG. 3 This illustrates the operation flow performed by the relay apparatus 100 according to the mode of the present invention.
Figure 4:
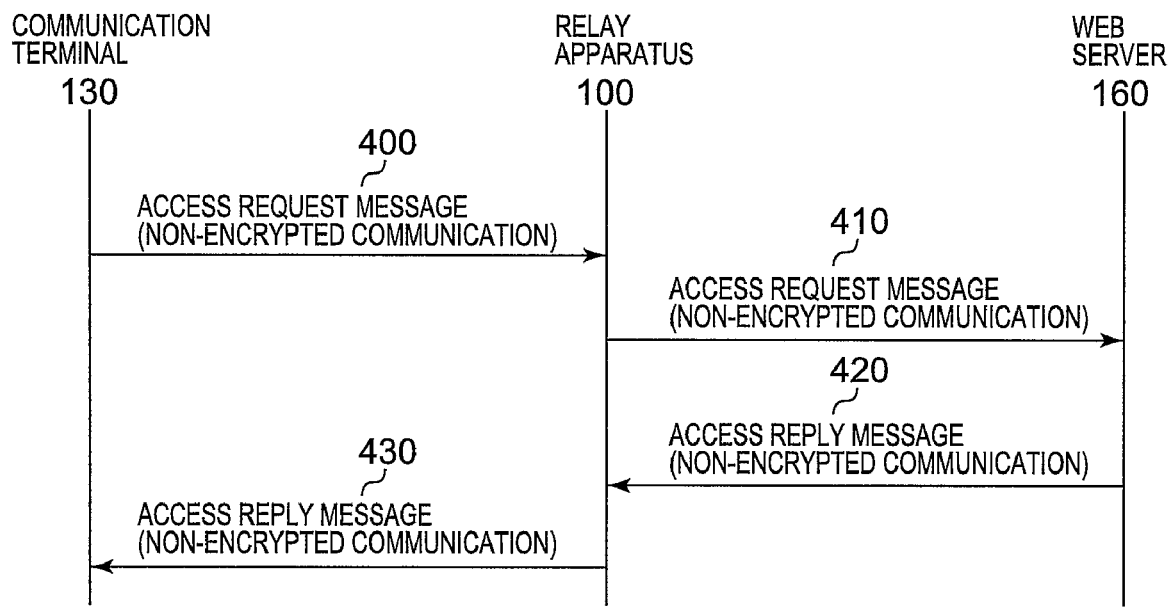
FIG. 4 This illustrates the non-encrypted communication sequence performed by the communication system 10 according to the mode of the present invention.
Figure 5:
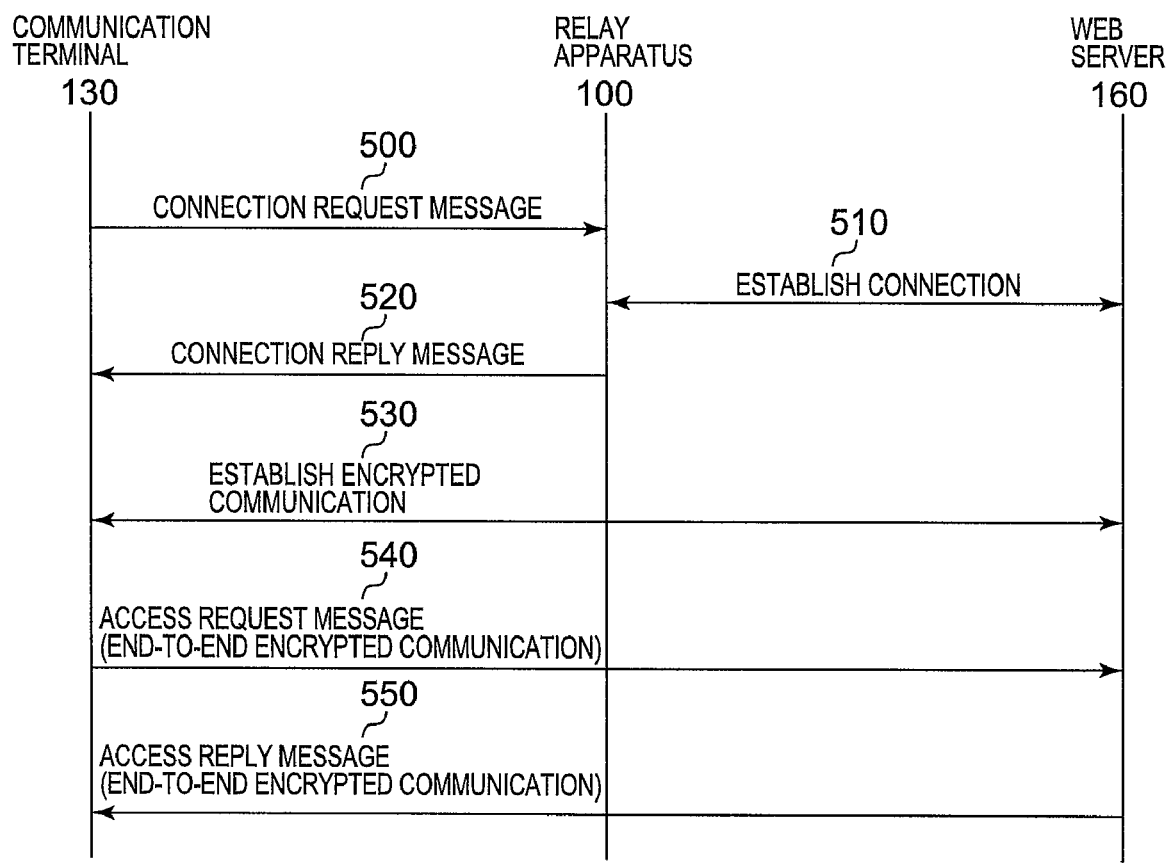
FIG. 5 This illustrates the end-to-end encrypted communication sequence performed by the communication system 10 according to the mode of the present invention.
Figure 6:
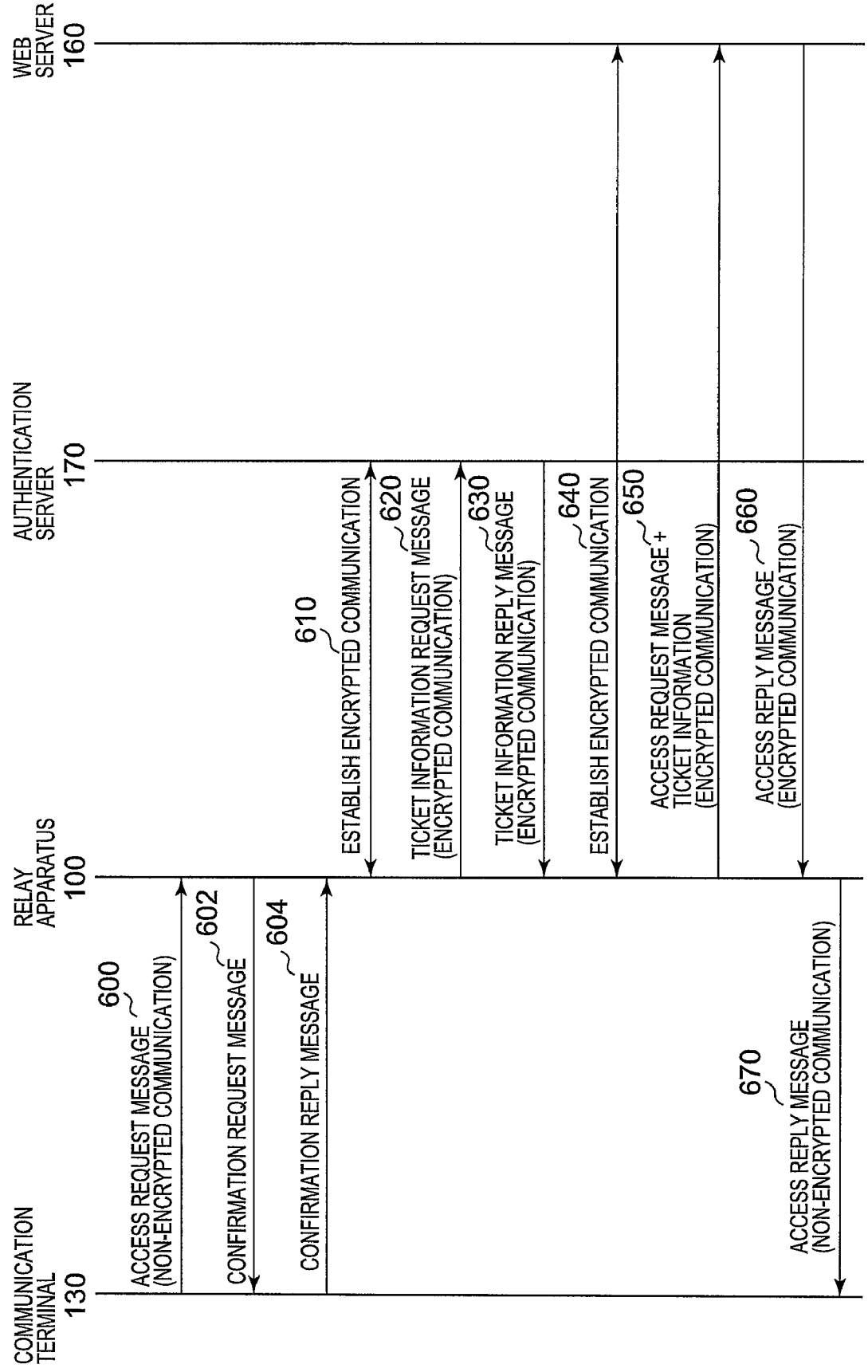
FIG. 6 This illustrates the inter-server encrypted communication sequence performed by the communication system 10 according to the mode of the present invention.
Figure 7:
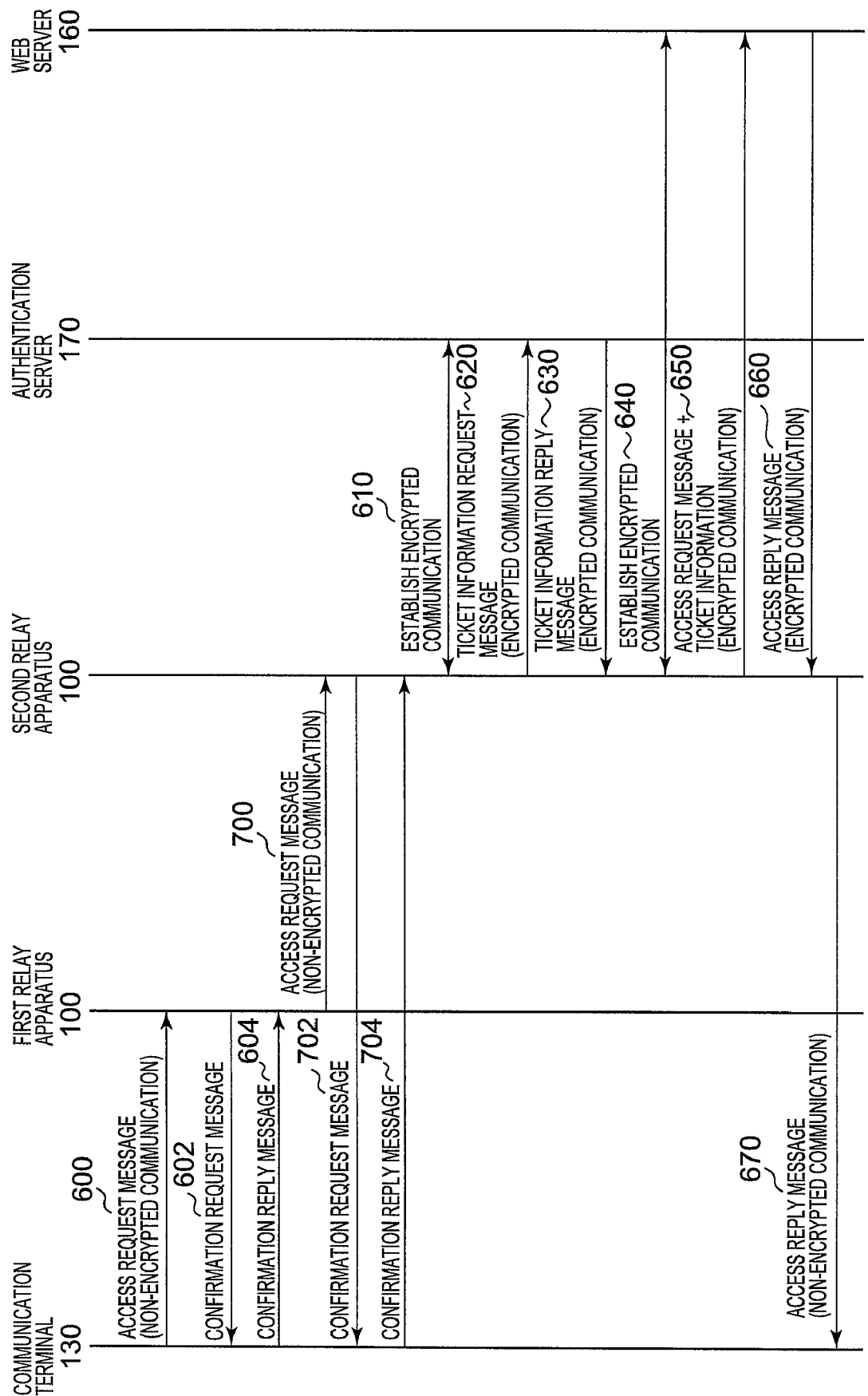
FIG. 7 This illustrates a modification of the inter-server encrypted communication sequence performed by the communication system 10 according to the mode of the present invention.
Figure 8:
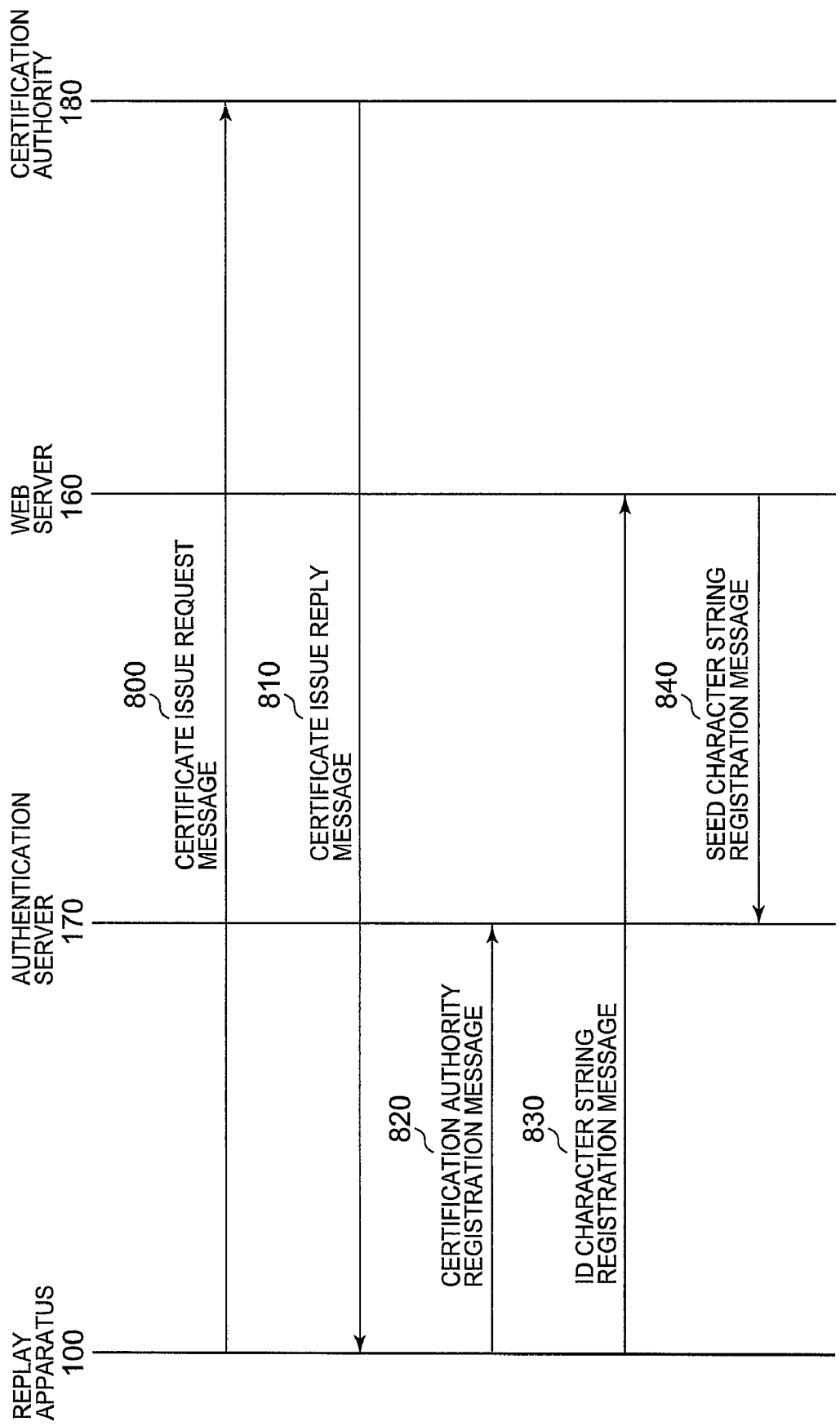
FIG. 8 This illustrates the sequence for preparing for the generation of ticket information, performed by the communication system 10 according to the mode of the present invention.
Figure 9:
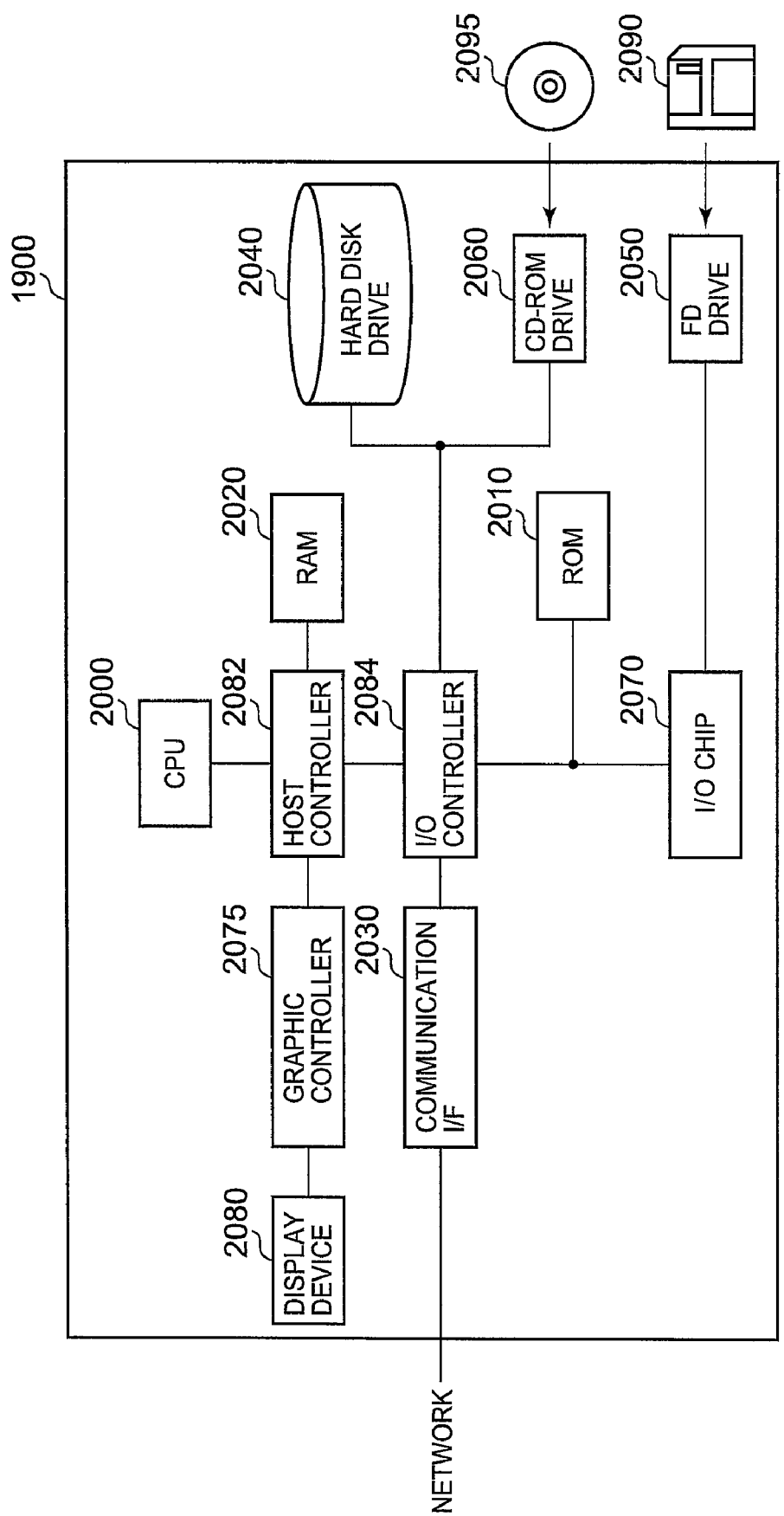
FIG. 9 This illustrates an example configuration for a computer 1900 according to the mode of the present invention.

10: communication system
100: relay apparatus
110: first network
120: base station
130: communication terminal
150: second network
160: Web server
170: authentication server
180: certification authority
200: access request receiver
205: request monitoring unit
210: authentication information acquisition unit
215: ticket information acquisition unit
220: confirmation request transmitter
225: confirmation reply receiver
230: service information storage unit
235: gateway application processor
240: access request transmitter
245: access reply receiver
250: reply monitoring unit
255: link change instruction information acquisition unit
260: content converter
265: access reply transmitter
400: access request message
410: access request message
420: access reply message
430: access reply message
500: connection request message
510: establishing connection
520: connection reply message
530: establishing encrypted communication
540: access request message
550: access reply message
600: access request message
602: confirmation request message
604: confirmation reply message
610: establishing encrypted communication
620: ticket information request message
630: ticket information reply message
640: establishing encrypted communication
650: access request message
660: access reply message
670: access reply message
700: access request message
702: confirmation request message
704: confirmation reply message
800: certificate issue request message 810: certificate issue request message
820: certification authority registration message
830: ID character string registration message
840: SEED character string registration message
1900: computer
2000: CPU
2010: ROM
2020: RAM
2030: communication interface
2040: hard disk drive
2050: flexible disk drive
2060: CD-ROM drive
2070: input/output chip
2075: graphic controller
2080: display device
2082: host controller
2084: input/output controller
2090: flexible disk
2095: CD-ROM

The invention claimed is:

1. A method for relaying communications between a communication terminal and a server, said relay apparatus disposed between and connected to a first network and a second network, said first network disposed between and connected to the communication terminal and the relay apparatus, said second network disposed between and connected to the server and the relay apparatus, an authentication server and a certification authority connected to the second network, said method comprising:

receiving, by the relay apparatus from the communication terminal, an access request for a service to be performed by the server for the communication terminal, wherein the access request comprises:

web server destination information identifying the server, service identification information identifying the service, communication system designation information designating use of an inter-server encrypted communication system between the communication terminal and the server, authentication instruction information specifying that authentication of the relay apparatus is to be performed by the server, and authentication destination information identifying the authentication server to issue ticket information pertaining to said authentication of the relay apparatus;

requesting, by the relay apparatus from the authentication server, the ticket information, wherein the ticket information includes an identification (ID) character string that identifies the relay apparatus;

receiving, by the relay apparatus from the authentication server, the ticket information in response to said requesting the ticket information;

encrypting, by the relay apparatus, the access request;

transmitting, by the relay apparatus to the server, the encrypted access request and the ticket information;

receiving, by the relay apparatus from the server, an encrypted access reply that is responsive to the access request, after said authentication of the relay apparatus has been performed by the server based on analysis by the server of the ticket information;

decrypting, by the relay apparatus, the access reply; and transmitting, by the relay apparatus to the communication apparatus, the decrypted access reply.

2. The method of claim 1, wherein the method further comprises after said receiving the access request and before said requesting the ticket information:

verifying, by the relay apparatus, that communication system permission information in a service information storage unit of the relay apparatus designates the inter-server encrypted communication system for use with the service.

3. The method of claim 2, wherein the method further comprises after said verifying and before said requesting the ticket information:

confirming, by the relay apparatus, that authentication permission information in the service information storage unit indicates that acquisition of the ticket information by the relay apparatus is permitted for the service.

4. The method of claim 3, wherein the method further comprises after said confirming and before said requesting the ticket information:

ascertaining, by the relay apparatus, that confirmation permission information in the service information storage unit indicates that the relay apparatus is permitted to transmit a confirmation request to the communication apparatus, said confirmation request requesting confirmation that the relay apparatus is permitted to request the ticket information from the authentication server;

after said ascertaining, transmitting the confirmation request from the relay apparatus to the communication apparatus; and receiving, by the relay apparatus from the communication apparatus, a confirmation reply comprising said confirmation.

5. The method of claim 3, wherein the ticket information received by the relay apparatus from the authentication server comprises an encryption of both the ID character string and a SEED character string generated by the server.

6. The method of claim 5, wherein the method further comprises before said requesting the ticket information:

transmitting, by the relay apparatus to the server, the ID character string to enable the server to subsequently transmit a SEED character string registration message to the authentication server, said SEED character string registration message comprising the SEED character string generated by the server and the ID character string.

7. The method of claim 6, wherein the method further comprises before said transmitting the ID character string by the relay apparatus to the server:

requesting, by the relay apparatus from the certification authority, a certificate for the relay apparatus to authenticate the relay apparatus;

receiving, by the relay apparatus from the certification authority, the certificate in response to said requesting the certificate; and transmitting, by the relay apparatus to the authentication server, a registration message that registers at the authentication server the certification authority as having authenticated the relay apparatus.

8. The method of claim 1, wherein the access reply comprises a first document that includes link information with respect to accessing a second document, and wherein the method further comprises after said decrypting the access reply:

analyzing, by the relay apparatus, the access reply and determining from said analyzing that the access reply comprises link change instruction information for changing the link information; and changing, by the relay apparatus, the link information in accordance with the link change instruction information.

9. The method of claim 8, wherein the link change instruction information specifies changing the link information so that the inter-server encrypted communication system is used for processing a second access request for accessing the second document.

10. The method of claim 8, wherein the link change instruction information specifies changing the link information so that an end-to-end encrypted communication system is used for processing a second access request for accessing the second document.

11. A system comprising a processor and a computer readable memory unit coupled to the processor, said memory unit containing instructions that when executed by the processor perform the method of claim 1.

12. A computer program product, comprising a computer a readable storage device having a computer readable program code stored therein, said computer readable program code containing instructions that when executed by a processor of a computer system perform a method for relaying communications between a communication terminal and a server, said relay apparatus disposed between and connected to a first network and a second network, said first network disposed between and connected to the communication terminal and the relay apparatus, said second network disposed between and connected to the server and the relay apparatus, an authentication server and a certification authority connected to the second network, said method comprising:

receiving, by the relay apparatus from the communication terminal, an access request for a service to be performed by the server for the communication terminal, wherein the access request comprises:
web server destination information identifying the server,
service identification information identifying the service,
communication system designation information designating use of an inter-server encrypted communication system between the communication terminal and the server,
authentication instruction information specifying that authentication of the relay apparatus is to be performed by the server, and
authentication destination information identifying the authentication server to issue ticket information pertaining to said authentication of the relay apparatus;
requesting, by the relay apparatus from the authentication server, the ticket information, wherein the ticket information includes an identification (ID) character string that identifies the relay apparatus;
receiving, by the relay apparatus from the authentication server, the ticket information in response to said requesting the ticket information;
encrypting, by the relay apparatus, the access request;
transmitting, by the relay apparatus to the server, the encrypted access request and the ticket information;
receiving, by the relay apparatus from the server, an encrypted access reply that is responsive to the access request, after said authentication of the relay apparatus has been performed by the server based on analysis by the server of the ticket information;
decrypting, by the relay apparatus, the access reply; and
transmitting, by the relay apparatus to the communication apparatus, the decrypted access reply.

13. The computer program product of claim 12, wherein the method further comprises after said receiving the access request and before said requesting the ticket information:
verifying, by the relay apparatus, that communication system permission information in a service information storage unit of the relay apparatus designates the inter-server encrypted communication system for use with the service.

14. The computer program product of claim 13, wherein the method further comprises after said verifying and before said requesting the ticket information:
confirming, by the relay apparatus, that authentication permission information in the service information storage unit indicates that acquisition of the ticket information by the relay apparatus is permitted for the service.

15. The computer program product of claim 14, wherein the method further comprises after said confirming and before said requesting the ticket information:
ascertaining, by the relay apparatus, that confirmation permission information in the service information storage unit indicates that the relay apparatus is permitted to transmit a confirmation request to the communication apparatus, said confirmation request requesting confirmation that the relay apparatus is permitted to request the ticket information from the authentication server;
after said ascertaining, transmitting the confirmation request from the relay apparatus to the communication apparatus; and
receiving, by the relay apparatus from the communication apparatus, a confirmation reply comprising said confirmation.

16. The computer program product of claim 14, wherein the ticket information received by the relay apparatus from the authentication server comprises an encryption of both the ID character string and a SEED character string generated by the server.

17. The computer program product of claim 16, wherein the method further comprises before said requesting the ticket information:
transmitting, by the relay apparatus to the server, the ID character string to enable the server to subsequently transmit a SEED character string registration message to the authentication server, said SEED character string registration message comprising the SEED character string generated by the server and the ID character string.

18. The computer program product of claim 17, wherein the method further comprises before said transmitting the ID character string by the relay apparatus to the server:
requesting, by the relay apparatus from the certification authority, a certificate for the relay apparatus to authenticate the relay apparatus;
receiving, by the relay apparatus from the certification authority, the certificate in response to said requesting the certificate; and
transmitting, by the relay apparatus to the authentication server, a registration message that registers at the authentication server the certification authority as having authenticated the relay apparatus.

19. The computer program product of claim 12, wherein the access reply comprises a first document that includes link information with respect to accessing a second document, and wherein the method further comprises after said decrypting the access reply:

analyzing, by the relay apparatus, the access reply and determining from said analyzing that the access reply comprises link change instruction information for changing the link information; and changing, by the relay apparatus, the link information in accordance with the link change instruction information.

20. The computer program product of claim 19, wherein the link change instruction information specifies changing the link information so that the inter-server encrypted communication system is used for processing a second access request for accessing the second document.

* * * * *